United States Patent Office 3,321,115
Patented May 23, 1967

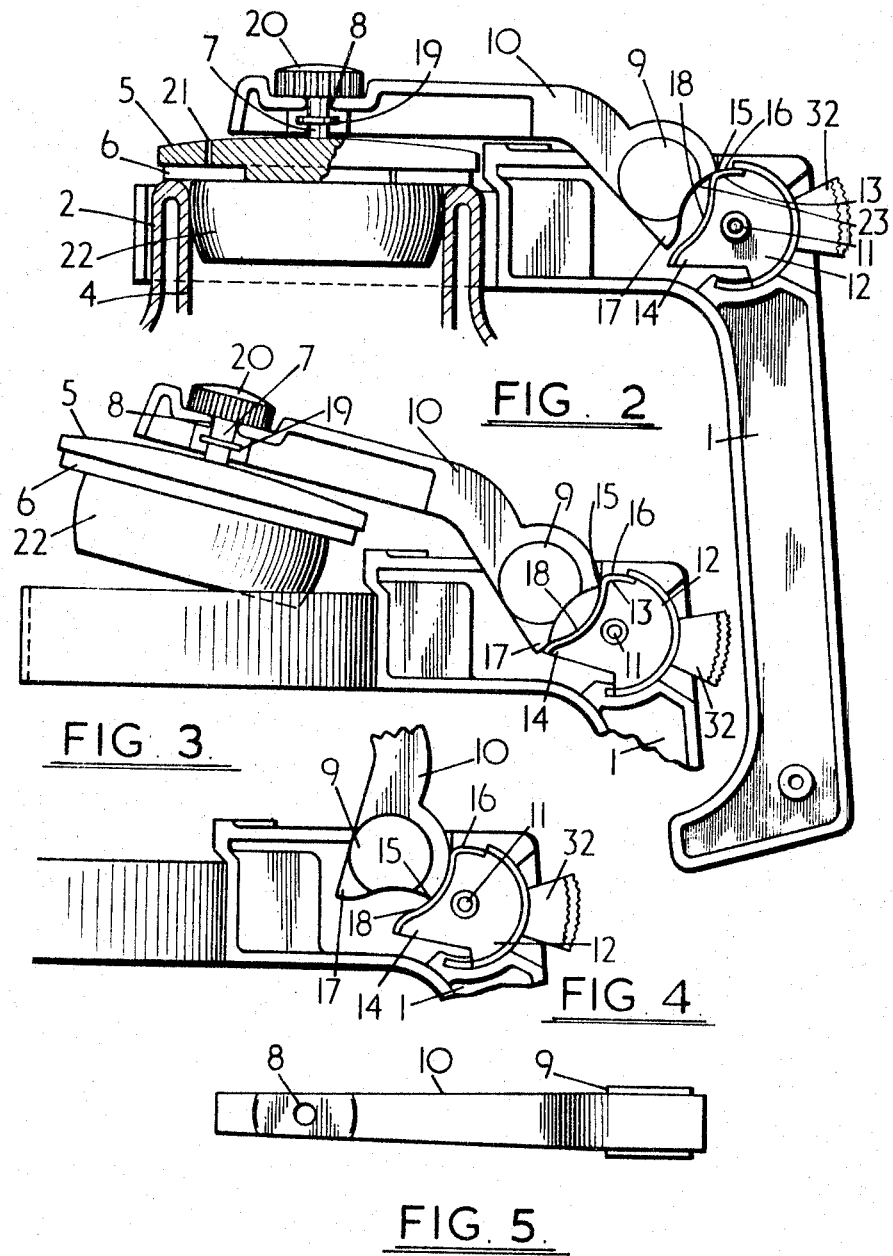

3,321,115
OPERATING MEMBER FOR A STOPPER FOR CLOSING VACUUM FLASKS AND SIMILAR CONTAINERS
Sten Rendahl, Jonkoping, Sweden, assignor to Aktiebolaget Termoverken, Jonkoping, Sweden, a company of Sweden
Filed July 20, 1965, Ser. No. 473,293
Claims priority, application Sweden, July 24, 1964, 8,999/64
1 Claim. (Cl. 222—505)

The invention relates to an operating member for a stopper for closing vacuum flasks and similar containers and has particular reference to such containers having a stopper which is disposed at the free end of a closure arm arranged to be filtered upwards about a tilt bearing.

The object of the invention is to provide an operating member which can lock the stopper securely in the closed position and is easy to operate for the purpose of opening the stopper, and this object is achieved by means of an operating member that is pivotally carried on a pivot bearing disposed alongside the tilt bearing, the bearing part of the closure arm being equipped with a surface element concentric with the tilt bearing and adapted to engage, in the open position of the operating member, in a corresponding concave recess in the bearing part of the operating member. The object of the invention is further achieved in that the bearing part of the operating member has at the upper part a surface element concentric with the pivot bearing for engaging, in the locking position of the sotpper, in a corresponding concave recess in the bearing part, so that thereby the closure arm is locked; and furthermore that the bearing part of the operating member has a lifting projection disposed underneath its recess, provided for the purpose of engaging an opening projection on the bearing part of the closure arm on the tilting of the operating member out of the locking position into the open position, and for tilting the closure arm upward together with the stopper.

The invention will now be described with references to the accompanying drawings, which are given in no restrictive sense.

FIGURE 2 shows the upper region of the vacuum flask in closed position of the operating member, partially in section, certain parts having been removed for the purpose of clarity.

FIGURE 3 shows the same arrangement with the stopper in half-opened position.

FIGURE 4 is a part view with completely open stopper.

FIGURE 5 shows a top view of the closure arm.

Figure 1:
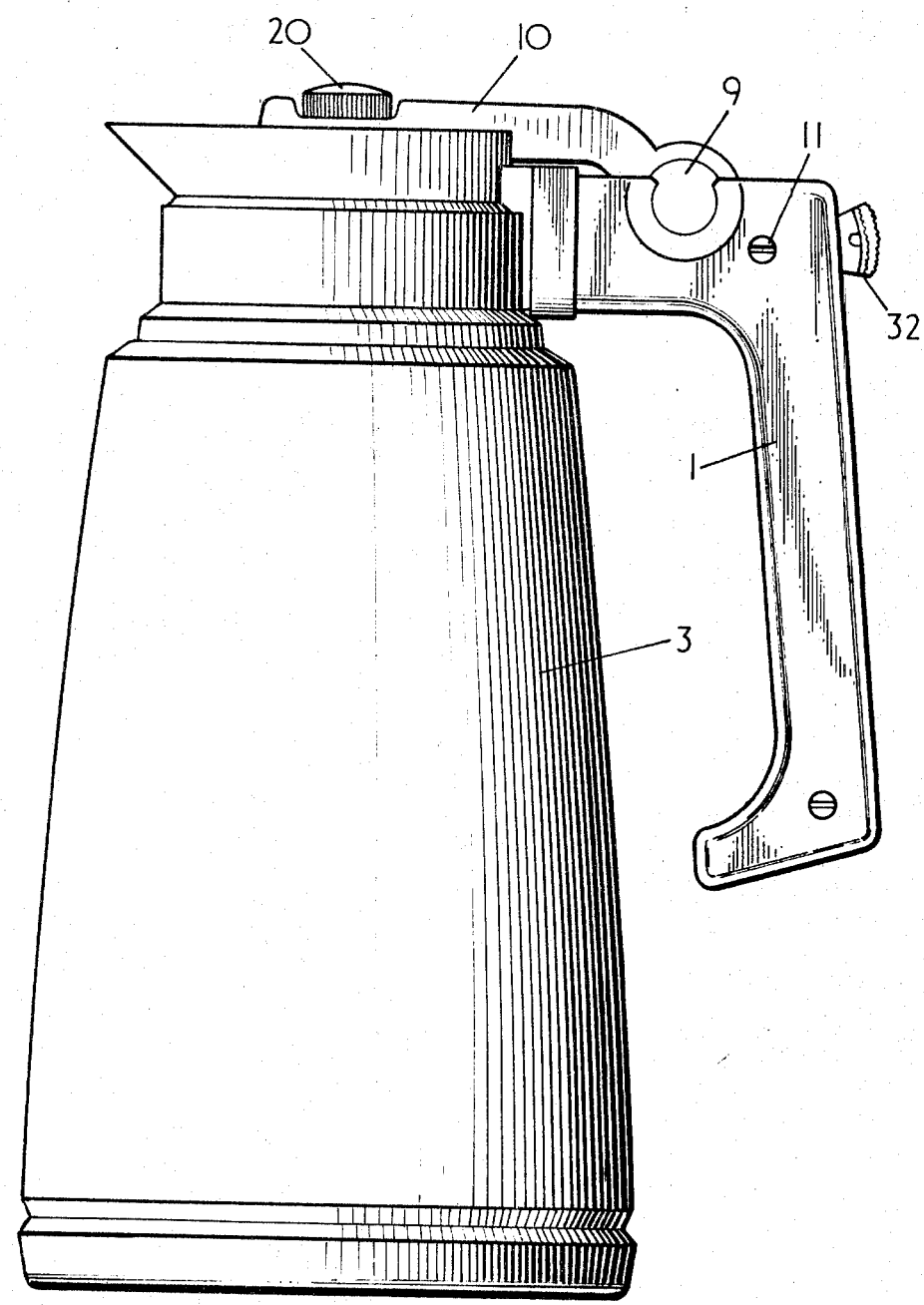
FIGURE 1 shows a side view of a vacuum flask which is provided with the operating member of the invention.

The arrangement shown in the drawing consists of a carrying handle 1, which is fixed to a neck 2 of a vacuum flask 3. A glass flask 4 set in the vacuum flask 3 can be closed by means of a stopper 5 with cooperation of a sealing ring 6 of rubber that can be pressed against the upper edge of the flask opening. A screw 7 screwed in the stopper is passed through a hole 8 in a closure arm 10 carried in the handle so as to be capable of tilting up about a tilt bearing 9. In the handle is furthermore disposed an operating member 12 pivotable about a pivot bearing 11. The bearing part of the member has, above, a locking projection 13, and, below, a lifting projection 14. The operating member can be turned by means of an operating arm or member 32 standing off from it.

If the operating member in the drawing is turned in the counter-clockwise direction, the outer end of the locking projection 13 is brought into contact with a closure projection 15 disposed, above, on the bearing part of the closure arm 10, whereupon the locking projection turns the closure projection also in the counter-clockwise direction, with the result that the stopper 5 is pressed against the upper edge of the flask neck 2. The bearing part of the operating member has close by the locking projection 13 an outer cylinder-surface 16 concentric with the pivot bearing 11 and provided for the purpose of being partially introduced into a recess 23 in the bearing part of the closure arm, when the stopper has closed the container, blocking in this way the closure arm 10 against pivoting in the clockwise direction.

The shape of the recess can be such that in the locking position it is substantially concentric with the pivot bearing 11 of the operating member 12. Accordingly, in the locking position the locking projection 13 forms substantially a right angle with the closure projection 15. The bearing part of the operating member 12 has, above, a lifting projection 14 which is arranged to come in contact, on the turning of the operating member in the opening direction, i.e. in the drawing on the clockwise direction, with an opening projection 17 arranged in the bearing part of the closure arm under the recess 23, and to tilt the closure arm into the opening direction. When this takes place, the lifting projection 14 slides along the projection 17, as can be seen from FIGURE 3 in detail. The projections 13 and 14 in this event consequently form an angle with each other and between them in the operating member there is located a recess 18 into which in the opened position of the operating member, the projection 15 of the closure arm can tilt, on the further tilting of the closure arm in the opening direction, as can be seen in detail in FIGURE 4. For this purpose the recess in this position can have a cylindrical-surface concentric with tilt bearing 9. From the position shown in FIGURE 3 one can therefore tilt the closure arm further upwardly and open the stopper fully.

If the container is to be closed, one tilts the stopper 5 and the closure arm 10 downwardly, and turns the operating member 12 by means of the operating arm 32 in the counterclockwise direction, whereupon, as mentioned above, the projection 13 comes into contact with the projection 15 and the closure of the stopper is completed. If one turns the operating member further, then the cylinder-surface 16, concentric with the pivot bearing 11, and the operating member are inserted under the projection 15 and partially into the recess 23, and block the closure arm 10 against being tilted upwardly.

The pressure between the stopper 5 and the edge of the flask neck 2 can be regulated by means of the screw 7 and a nut 19 is disposed on the same between the stopper and screw head 20 and underneath a narrower part of the opening 8.

Care should however be taken that between the screw head 20 and the narrower opening 8 in the stopper there is a certain play, so that the stopper can be tilted a little in relation to the closure arm 10. If a hot liquid, for example coffee is poured into the container and the stopper is closed, then one obtains a complete sealing between the stopper and the flask by the sealing ring 6. If the container then remains standing so that the temperature of the coffee gradually sinks, then a vacuum occurs in the glass flask, which can make difficult the opening of the stopper. In order to prevent this, a few comparatively small holes 21 are made through the stopper and against the upper surface of the rubber ring. If a vacuum occurs in the glass flask air can pass downwardly through the holes and along the upper surface of the rubber ring 6 inwardly to the center of the stopper and be suctioned into the container, with the result that there ceases to be a vacuum. As long as the liquid is hot and excess pressure rules in the container the rubber ring will, however, be pressed upwardly against the lower edge of the stopper, so that the holes 21 are blocked by the rubber ring.

The stopper can be constructed with a part 22 penetrating into the neck of the flask with a certain play for facilitating the correct positioning of the stopper.

The invention is naturally not restricted to the embodiments described above and shown in the drawings, but can be varied further within the framework of the following patent claim.

I claim:

In an operating arrangement for a stopper for closing vacuum and other containers, said stopper being fixed on a closure arm that is carried on the container so as to be tiltable upwardly about a tilt bearing, the improvement consisting in an operating member which is carried tiltably about a pivot bearing disposed adjacent to the tilt bearing, the bearing part of the said closure arm being equipped with a surface element concentric with the tilt bearing, which element is adapted to engage, in the open position of the operating member, in a corresponding concave recess in the bearing part of the operating member; further, that the bearing part of the operating member is provided, above, with a surface element concentric with the pivot bearing, for engagement, in the locking position of the stopper, in a corresponding concave recess in the bearing part of the closure arm, so as thereby to lock the said closure arm; and furthermore that the bearing part of the operating member has a lift projection disposed underneath the recess, which is adapted to engage, on the tilting of the operating member out of the locking position towards the open position, an opening projection disposed in the path of the lift projection on the bearing part of the closure arm and to tilt the closure arm upwardly, together with the stopper.

References Cited by the Examiner

UNITED STATES PATENTS

| | | | |
|---|---|---|---|
| 2,364,206 | 12/1944 | Gardes | 222—505 X |
| 2,753,070 | 7/1956 | Ruetz | 222—505 X |

ROBERT B. REEVES, *Primary Examiner.*

HADD S. LANE, *Examiner.*